Dec. 15, 1959 C. H. GRAULING, JR 2,917,713

FREQUENCY CONTROL SYSTEM

Filed May 11, 1956

WITNESSES:
Bernard R. Gieguey
Leon J. Laza

INVENTOR
Charles H. Grauling, Jr.
BY
F. H. Murray
ATTORNEY

United States Patent Office 2,917,713

Patented Dec. 15, 1959

2,917,713

FREQUENCY CONTROL SYSTEM

Charles H. Grauling, Jr., Baltimore, Md., assignor to Westinghouse Electric Corporation, East Pittsburgh, Pa., a corporation of Pennsylvania Application May 11, 1956, Serial No. 584,272

8 Claims. (Cl. 331—6)

This invention relates to frequency control systems for microwave oscillators and more particularly to a frequency stabilization system for a klystron oscillator.

Several approaches to the problem of stabilization of microwave oscillators have heretofore been made. One of these approaches is shown and described in U.S. Patent No. 2,681,998, Pound, issued June 22, 1954, and another is covered in Proceedings of the IRE, volume 36, pages 794–800, June 1948. Each of these approaches uses the so-called IF stabilization system in which a klystron oscillator is locked to a high Q resonant cavity by means of circuitry operated at an IF frequency, usually 30 megacycles. In these systems, the output signal from the microwave plumbing is an IF voltage which is dependent in sign on, and proportional in amplitude to, the imaginary part of the reflection coefficient of the high Q cavity. After IF amplification, the output voltage is mixed with a voltage of the same frequency in a lock-in mixer and the result is a D.C. voltage that has the characteristics of a discriminator output voltage. This D.C. voltage is then used as a control signal for stabilizing the frequency of the oscillator.

It is a primary object of this invention to provide a new method for stabilizing the frequency of a microwave oscillator.

More specifically, an object of the invention lies in the provision of a method of IF frequency stabilization using a high Q cavity.

As will become apparent from the following detailed description, the frequency control system of the present invention uses the IF type of operation, but operates on an entirely different principle than those described above. In the present system, the output signal from the microwave circuit is an IF voltage whose amplitude is essentially constant over the operating range and whose phase is determined by the phase shift of the microwave signal passing through the high Q cavity. This IF signal is then amplified and mixed with a reference voltage of the same frequency in a phase detector, and the output is used to control the frequency of the oscillator. Thus, in prior systems the desired intelligence is in the amplitude of the IF signal, but in the new system described herein the intelligence is in the phase of the IF signal. Consequently, although crystal and tube noise was a limiting factor in prior frequency control systems, standard FM techniques such as limiting may be applied to the new system to permit recovery of the phase information without similar noise problems.

The above and other objects and features of the invention will become apparent from the following detailed description taken in connection with the accompanying drawings which form a part of this specification and in which.

Figure 1:
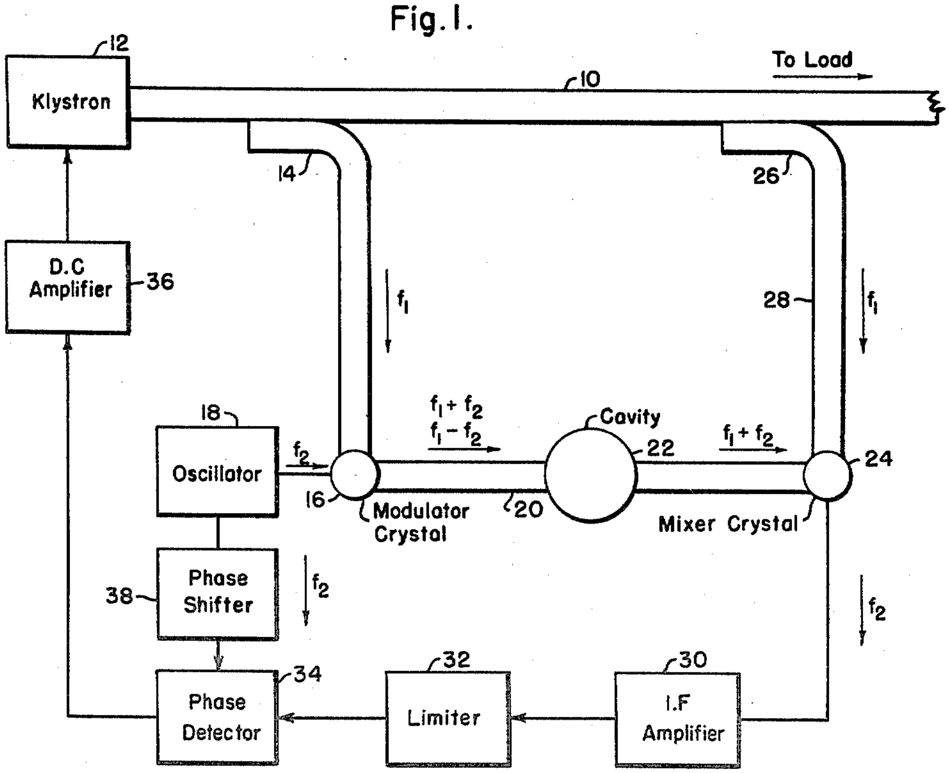
Figure 1 is a schematic circuit diagram of the invention.

Referring to Fig. 1, it can be seen that microwave energy is supplied to a wave guide transmission line 10 by a klystron oscillator 12 operating at a frequency $f_1$. From transmission line 10, the energy passes to a load or utilization device, not shown. A portion of this energy is sampled by a directional coupler 14 and fed to a modulator crystal 16 where it is modulated by an auxiliary oscillator 18 operating at a frequency $f_2$, usually near 30 megacycles. The output signal from modulator crystal 16 appearing in wave guide 20 is a double sideband suppressed carrier signal containing frequencies $f_1+f_2$ and $f_1-f_2$. The upper sideband, $f_1+f_2$, will be used in describing the operation of the system but it should be understood that either sideband could be used with the same results, the only difference being the frequency to which the resonant cavity 22 is tuned. The desired sideband is selected by the high-Q transmission cavity 22 and fed to a mixer crystal 24 where it is combined with a second sample of the klystron output signal derived by means of directional coupler 26 and wave guide section 28. The mixer crystal 24 produces a difference frequency IF signal having a frequency $f_2$. The mixer 24 comprises a square law device, the characteristic of which is represented by $$i_p=ae_g^2$$

where $i_p$ is the instantaneous output current from the mixer, $a$ is a constant and $e_g$ is the instantaneous input voltage to the mixer.

The crystal mounts shown in Fig. 1 may take any one of a variety of forms. They may be made by inserting a crystal in a wave guide section, by feeding a crystal from two guides, or by using a normal crystal holder on a directional coupler. In fact, magic tees may be used to provide a balanced modulator and a balanced mixer, if desired. Such tees would provide a convenient physical arrangement and at the same time provide better carrier suppression in the modulator and more effective isolation of the main output from the various sidebands.

The output signal from mixer crystal 24 is passed through an IF amplifier 30 and limiter 32 to a phase detector 34 where it is compared with a reference signal of frequency $f_2$ from oscillator 18. The output from the phase detector is a direct current signal which is fed to the repeller (not shown) of the klystron 12 through a direct current amplifier 36.

Figure 2:
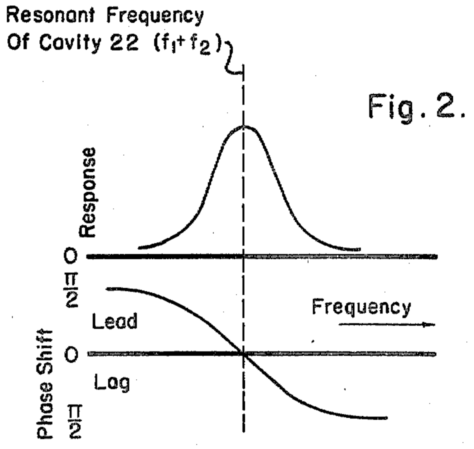
Fig. 2 is a graphic illustration of the transmission characteristics of the resonant cavity shown in Fig. 1.

The transmission characteristics of the resonant cavity 22 are shown in Fig. 2. As the klystron frequency shifts from the desired value $f_1$, to a new value $f_1+\Delta f$, there will be a phase shift in the sideband energy (now of frequency $f_1+f_2+\Delta f$) arriving at mixer crystal 24 in accordance with Fig. 2. The signal of frequency $f_1+\Delta f$ arriving at the mixer crystal through wave guide section 28 will suffer a phase shift due only to changing guide wave length and this is negligible compared to that caused by the cavity. Over very small changes of frequency (which must be the case for a well stabilized oscillator), the system will be working on the peak of the cavity response curve and, hence, the output signal will be essentially constant.

The output signal from modulator crystal 16 may be represented by $$E_c m(\cos\omega_2 t)(\cos\omega_1 t)$$

where $E_c$ represents the input carrier amplitude of frequency $f_1$, $m$ represents the modulation index, and $\omega_1 t$ and $\omega_2 t$ represent the time angles in radians of the output signal of klystron 12 and oscillator 18, respectively. Assuming the upper sideband is transmitted by resonant cavity 22, the signal arriving at mixer crystal 24 through wave guide 20 may be represented by $$E_c\frac{m}{2}K\cos[(\omega_1+\omega_2)t+\theta]$$

where K represents the fraction of the signal transmitted by the cavity and $\theta$ reprents the phase shift due to the cavity as shown in Fig. 2.

A full and detailed description of the operation of the crystal mixer 24 may be had by reference to "Electron Tube Circuits," S. Seely, McGraw-Hill Book Co., Inc., New York, pages 358–9; 1950. For purposes of the present description, however, it should be sufficient to state that the signal of frequency $f_1$ arriving at the mixer crystal 24 may be represented by $$E_0 \cos (\omega_1 t + \psi)$$

where $E_0$ is the amplitude of the signal coming through the coupler 26 and $\psi$ is a phase angle determined by the effective difference in path length for the two signals applied to the mixer crystal. If this signal is mixed with the output of cavity 22 represented by $$E_c \frac{m}{2} K \cos [(\omega_1 + \omega_2)t + \theta]$$

in a square law device such as mixer 24 of characteristic $$i_p = a e_g^2$$

it may be shown that the output current at the intermediate or difference frequency is given by $$i = a \frac{m}{2} K E_c E_0 \cos (\omega_2 t + \theta - \psi)$$

For a particular component configuration $\psi$ is fixed. Thus, the output from the mixer crystal 24 is of the form $$\cos (\omega_2 t + \theta)$$

which is a constant amplitude signal of variable phase; and by comparison with a reference signal of frequency $f_2$ in the phase detector 34, the necessary control voltage for klystron 12 may be developed. Since the necessary information is contained in the phase of the output signal, the signal may be limited by limiter 32 to remove noise difficulties; and the system will still function properly.

The usual type of phase detector requires that the input signals be 90 degrees out of phase for zero output. Also, there may be some phase shift in the IF amplifier 30, and the phase angle $\psi$, although fixed, may not be zero. A phase shifter 38 is therefore inserted in the reference signal ch nnel between oscillator 18 and phase detector 34. Thi phase shifter is manually operated and is set to provide maximum signal into the limiter, ensuring operation on the peak of the cavity response curve as previously described.

It can thus be seen that the present invention provides a frequency control system in which the desired intelligence is contained in the phase of a mixer output signal rather than in its amplitude. Consequently, limiting may be employed to reduce the effects of crystal and tube noise. As shown in Fig. 1, the two signals arriving at the mixer crystal 24 will inherently travel equal length paths. However, these paths may be adjusted independently if desired for a particular application. The two signals may also be attenuated independently if desired for a particular application or test.

Although the invention has been described in connection with a certain specific embodiment, it will be readily apparent to those skilled in the art that various changes in form and arrangement of parts can be made to suit requirements without departing from the spirit and scope of the invention.

I claim as my invention:

1. A frequency control system for a microwave frequency generator comprising first means for sampling the output energy of said generator, an oscillator, means for modulating the sampled output of said generator with the output of said oscillator, means for filtering the output of said modulating means, second means for sampling the output of said generator, means for mixing the output of said filtering means with the wave energy derived by the second sampling means, means coupled to said mixing means and to said oscillator for producing a direct current voltage which is proportional to the phase difference between signals from said mixer and those from said oscillator, and means for applying the output of said last-mentioned means to said frequency generator as a control voltage.

2. The combination claimed in claim 1 wherein the output of said modulating means is a double sideband suppressed carrier signal and wherein the output of said mixing means is a constant amplitude signal of variable phase.

3. A frequency control system for a microwave frequency generator comprising first means for sampling the output energy of said generator, an oscillator, means for modulating the sampled output of said generator with the output of said oscillator, a wave guide transmission line connected to said modulating means for receiving output energy therefrom, a resonant cavity included in said transmission line, second means for sampling the output energy of said generator, means connected to said second sampling means and to said transmission line for mixing energy derived from said second sampling means with that passing through said resonant cavity, means coupled to said mixing means and to said oscillator for producing a direct current voltage which is proportional to the phase difference between signals from said mixer and those from said oscillator, and means for applying the output of said last-mentioned means to said frequency generator as a control voltage.

4. In combination with a klystron frequency generator, a wave guide transmission line for conducting wave energy from said klystron, a first directional coupler joined to said transmission line for sampling a portion of the energy traveling therethrough, a second directional coupler joined to said transmission line for sampling a portion of the energy traveling therethrough, wave guide transmission apparatus connected between said couplers, said apparatus including modulating means, mixing means, and filter means interposed between said modulating and mixing means, said modulating means and mixing means both having energy of the frequency of the klystron generator applied thereto from the first and second directional couplers respectively, means for supplying a modulating signal to said modulating means to produce a modulating means output having two frequencies equal to the sum and difference of the klystron frequency and the frequency of the modulating signal, said filter means being constructed and arranged to pass to said mixing means only a selected one of said two frequencies, said mixing means providing a mixing means output having a frequency equal to the frequency of the modulating signal, a device responsive to said modulating signal and to the output of said mixing means for producing a direct current voltage which is proportional to the phase difference between the output signal from said mixing means and said modulating signal, and means for applying said direct current voltage to said klystron as a control signal.

5. In combination with a klystron frequency generator, a wave guide transmission line for conducting wave energy from said klystron, a first directional coupler joined to said transmission line for sampling a portion of the energy traveling therethrough, a second directional coupler joined to said transmission line for sampling a portion of the wave energy traveling therethrough, wave guide transmission apparatus interconnecting said couplers, a crystal modulator and a crystal mixer spaced along said transmission apparatus, a resonant cavity interposed between said mixer and said modulator, said modulator and mixer both having energy of the frequency of the klystron generator applied thereto from the first and second directional couplers respectively, means for supplying a modulating signal to said modulator to produce a modulator output having two frequencies equal to the sum and difference of the klystron frequency and the frequency of the modulating signal, said resonant cavity being constructed and arranged to pass to said mixer only a selected one of said two frequencies, said mixer providing a mixer output having a frequency equal to the frequency of the modulating signal, a phase detector responsive to the output of said mixer and to said modulating signal for producing a direct current voltage which is proportional to the phase difference between the output signal from said mixer and said modulating signal, and means for applying said direct current voltage to said klystron as a control signal.

6. In combination with a klystron signal generator, a wave guide transmission line for conducting wave energy from said klystron, a first directional coupler joined to said transmission line, a crystal modulator including modulation signal generator means, a wave guide transmission line connecting said modulator with said first coupler, said modulator supplying a modulator output having two frequencies equal to the sum and difference of the frequncy of the klystron signal and the frequency of the modulation signal, a second directional coupler joined to said first-mentioned transmission line, a crystal mixer, a wave guide transmission line connecting said mixer with the second directional coupler, and wave guide apparatus including a resonant cavity resonant at a selected one of said two frequencies interconnecting said modulator and said mixer whereby wave energy from said modulator which passes through the resonant cavity is mixed in said mixer with wave energy from said second directional coupler to produce a mixer output signal of the same frequency as said modulation signal and varying in phase with respect thereto in accordance with variations in the frequency of the klystron signal.

7. In combination with a klystron frequency generator, a wave guide transmission line for conducting wave energy from said klystron, a first directional coupler joined to said transmission line for sampling a portion of the energy traveling therethrough, a second directional coupler joined to said transmission line for sampling a portion of the wave energy passing therethrough, wave guide transmission apparatus interconnecting said couplers, a crystal modulator and a crystal mixer spaced along said transmission apparatus, said modulator and mixer both having energy of the frequency of the klystron generator applied thereto from the first and second directional couplers respectively, a resonant cavity interposed between said mixer and said modulator, means for supplying a modulating signal to said modulator to produce a modulator output having two frequencies equal to the sum and difference of the klystron frequency and the frequency of the modulating signal, said resonant cavity being constructed and arranged to pass to said crystal mixer only a selected one of said two frequencies, said crystal mixer providing a mixer output having a frequency equal to the frequency of the modulating signal, means responsive to the output of said mixer and to said modulating signal for producing a control signal which varies as a function of the phase difference between the output signal from said mixer and said modulating signal, and means for applying said control signal to said klystron to vary the output frequency thereof.

8. In combination with a frequency generator which produces an output frequency $f_1$, a source of signals having a frequency $f_2$, means for modulating a portion of the output of said generator with said source of signals to produce a suppressed carrier double sideband signal having a component of frequency $f_1+f_2$ and another component of frequency $f_1-f_2$, means for separating the component of frequency $f_1-f_2$ from that of frequency $f_1+f_2$, means for mixing a portion of the output of said generator with one of said components to produce a constant amplitude signal of frequency $f_2$, means for comparing the phase of the constant amplitude output of the mixing means with the phase of said source of signals to produce a control signal which varies as a function of the phase difference between the respective signals, and means to apply said control signal to said generator to vary the output frequency thereof.

References Cited in the file of this patent

UNITED STATES PATENTS 2,462,841 Bruck et al. ............ Mar. 1, 1949